United States Patent [19]
Gallup et al.

[11] Patent Number: 5,879,433
[45] Date of Patent: Mar. 9, 1999

[54] METHOD AND APPARATUS FOR REDUCING THE ACID GAS AND/OR INERT PARTICULATE CONTENT OF STEAM

[75] Inventors: Darrell L. Gallup, Santa Rosa; Thomas S. Powell, Windsor, both of Calif.

[73] Assignee: Union Oil Company of California, El Segundo, Calif.

[21] Appl. No.: 901,881

[22] Filed: Jul. 31, 1997

[51] Int. Cl.[6] ............................. B01D 53/14; B01D 53/68
[52] U.S. Cl. .............................. 95/186; 95/233; 95/235; 96/234; 96/243; 96/329; 423/242.7
[58] Field of Search .................... 95/107–111, 131, 95/132, 137, 233, 235, 156, 186, 187; 96/108, 121–123, 130, 133, 134, 142, 144, 150, 234, 235, 243, 256, 278, 279, 329; 423/240 R, 240 S, 242.7

[56] References Cited

U.S. PATENT DOCUMENTS

| | | | |
|---|---|---|---|
| 3,485,014 | 12/1969 | Atsukawa et al. | 95/137 X |
| 3,563,704 | 2/1971 | Torrence | 95/108 |
| 3,653,811 | 4/1972 | Zagorskaya et al. | 423/242.7 X |
| 3,660,967 | 5/1972 | Collins et al. | 95/137 |
| 3,717,976 | 2/1973 | Gappa et al. | 95/137 X |
| 3,886,261 | 5/1975 | Libutti | 95/137 X |
| 3,913,253 | 10/1975 | Juntgen et al. | 95/110 X |
| 3,945,811 | 3/1976 | Beasley et al. | 95/137 X |
| 4,061,476 | 12/1977 | Hölter et al. | 95/137 X |
| 4,240,923 | 12/1980 | Sartori et al. | 423/242.7 X |
| 4,279,872 | 7/1981 | Lassmann et al. | 95/235 X |
| 4,322,221 | 3/1982 | Kamody | 95/235 X |
| 4,557,921 | 12/1985 | Kirsch et al. | 95/132 X |
| 4,762,537 | 8/1988 | Fleming et al. | 95/132 |
| 4,844,162 | 7/1989 | Maassen et al. | 95/235 X |
| 5,264,013 | 11/1993 | Brentrup | 95/137 X |
| 5,316,998 | 5/1994 | Lee et al. | 95/131 X |
| 5,364,604 | 11/1994 | Spink et al. | 423/240 R X |
| 5,453,113 | 9/1995 | Zarchy et al. | 95/132 X |
| 5,688,479 | 11/1997 | Chao | 423/240 S |
| 5,797,979 | 8/1998 | Quinn | 95/97 |

FOREIGN PATENT DOCUMENTS

| | | | |
|---|---|---|---|
| 3003378 | 8/1981 | Germany | 95/233 |
| 50-015463 | 6/1975 | Japan | 95/137 |
| 50-015464 | 6/1975 | Japan | 95/137 |
| 1183156 | 10/1985 | U.S.S.R. | 95/132 |

OTHER PUBLICATIONS

"Adogen Amines for Solvent Extraction", Sherix Chemical Company, Inc., Dubli, Ohio, rev. 1–83.

"Summary of Comparative Properties", Rohm and Haas Company, Philadelphia, Pennsylvania.

"Amberlite LA–1", Technical Notes, Rohm and Haas Company, Philadelphia, Pennsylvania, May 1972.

Fisher et al., "Alternative to Traditional Water Washing Used to Remove Impurities in Superheated Geothermal Steam", Geothermal Resources Council Transactions, Vo. 20, Sep./Oct. 1996, pp. 737–741.

Primary Examiner—Robert Spitzer
Attorney, Agent, or Firm—Gregory F. Wirzbicki; Shlomo R. Frieman

[57] ABSTRACT

One or more contaminants selected from the group consisting of acidic gases, inert particulates, and mixtures thereof are removed from steam by contacting the contaminated steam with a nonaqueous sorbent such as crystalline molecular sieves, silica gels, soda ash, carbonaceous adsorbents, and amine liquid ion exchange resins.

27 Claims, 3 Drawing Sheets

METHOD AND APPARATUS FOR REDUCING THE ACID GAS AND/OR INERT PARTICULATE CONTENT OF STEAM

BACKGROUND

The present invention relates to a method and apparatus for reducing the concentration of contaminants or impurities entrained in steam, where the contaminants are selected from the group consisting of acid gases and inert particulates. More particularly, the invention relates to removing such contaminants from geothermal steam prior to extracting energy from the steam, e.g., prior to passing the steam through a turbine for the purpose of generating electricity.

Water washing is commonly employed to remove impurities from geothermal steam and thereby protect turbines from fouling (e.g., due to scale formation) and corrosion (e.g., due to the presence of acidic gases in the steam). However, water washing has its drawbacks. For example, water washing requires significant volumes of wash water to scrub the impurities from the steam. In addition, water washing quenches the steam and thus adversely reduces steam utilization and power generation. Furthermore, excessive water washing can send droplets to the turbine causing erosion damage to nozzles and blades. Also, aerated condensate, which is typically employed in water washing, introduces oxygen into the turbine and causes additional corrosion.

SUMMARY OF THE INVENTION

Accordingly, there is a need to optimize steam scrubbing to simultaneously remove entrained impurities, enhance steam utilization, and reduce turbine erosion and corrosion.

The present invention addresses this need by providing a method and apparatus for removing entrained steam impurities while eliminating both the need to water wash the steam and the adverse effects of such water wash procedure. In one method of the present invention, impurities selected from the group consisting of acidic gases, inert particulates, and mixtures thereof are removed from steam by the sequential steps of (a) contacting the contaminated steam with a nonaqueous sorbent that absorbs and/or adsorbs at least a portion of one of the impurities to form a treated steam having a reduced impurity concentration; and (b) separating the treated steam from the nonaqueous sorbent.

When employed to treat geothermal steam used to generate electricity, the procedure of the invention generally comprises the steps of (a) producing a geothermal fluid from a geothermal well, where the geothermal fluid comprises contaminated steam; (b) contacting the contaminated steam with the nonaqueous sorbent to form a treated steam having a reduced contaminant concentration; (c) separating the treated steam from the nonaqueous sorbent; and (d) extracting energy from the separated, treated steam. The system employed in this process typically comprises piping, valves and/or other means well known to those skilled in the art for producing the geothermal fluid from the geothermal well. The producing portion of the system is in fluid communication with a fixed or fluidized bed containing the nonaqueous sorbent or an injector or other means for contacting the contaminated steam with the nonaqueous sorbent to form a treated steam having a reduced contaminant concentration. When the fixed or fluidized bed is used, no separate separation apparatus is required because the treated steam separates from the nonaqueous sorbent upon exiting the bed. However, when the nonaqueous sorbent is injected into the steam, a separation bed or other means well known to those skilled in the art for separating fluidized solids and/or liquids from steam is employed to separate the nonaqueous sorbent from the treated steam. A turbine or other means well known to those skilled in the art for extracting energy from steam is in fluid communication with the contacting means and/or the separating means and extracts energy from the separated, treated steam.

DRAWINGS

The method and apparatus for removing contaminants from steam as well as other features, aspects, and advantages of the present invention will be better understood with reference to the following description, appended claims, and figures where identical numbering identifies identical parts and:

DETAILED DESCRIPTION OF THE INVENTION

Figure 1:
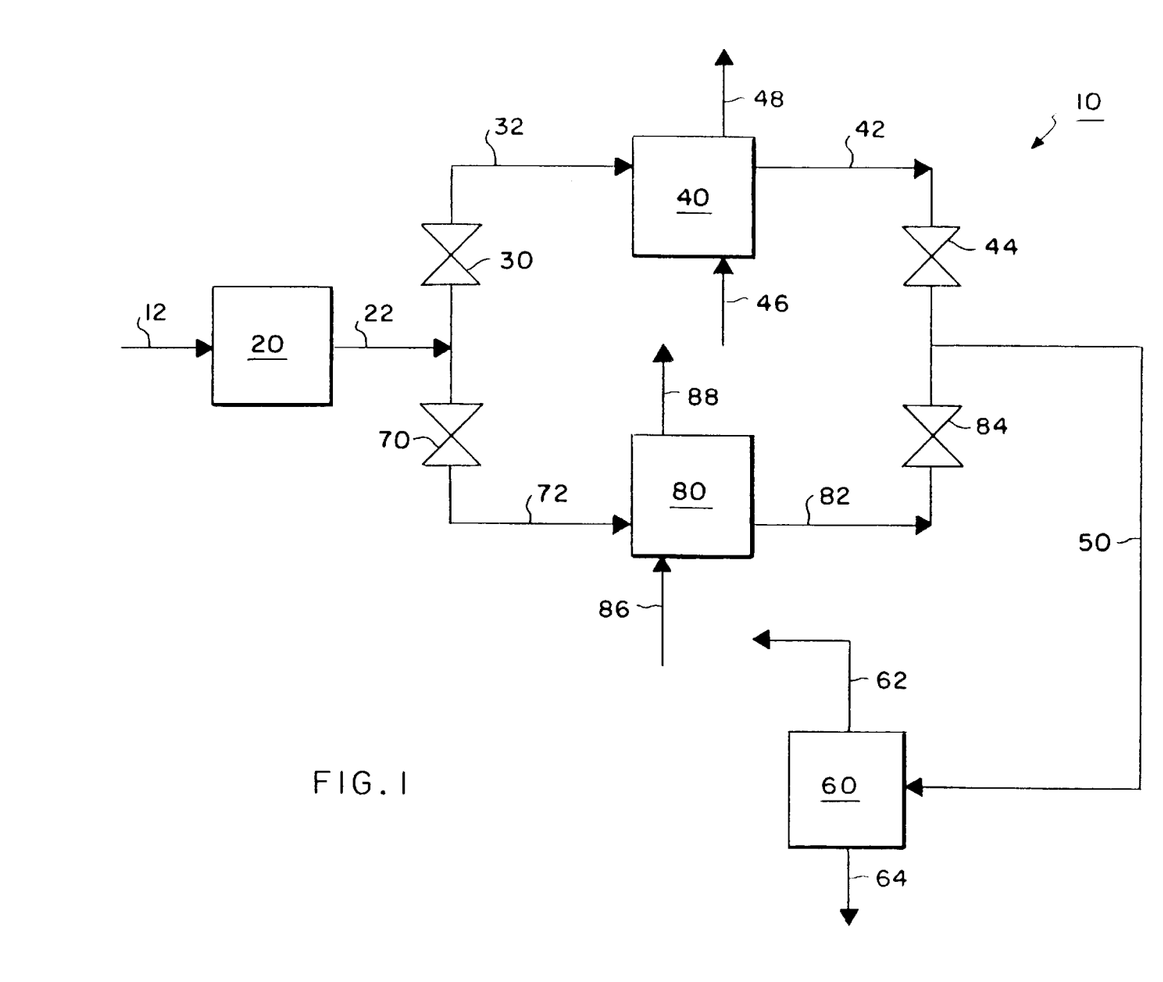
FIG. 1 is a schematic diagram of a portion of a geothermal energy extraction process embodying features of a first version of the invention.

With reference to the drawings, FIG. 1 depicts a portion of a system 10 for extracting energy from a geothermal fluid. More specifically, a steam-containing geothermal fluid produced from one or more geothermal wells (not shown) is transported in a conduit 12. When a substantial portion of the geothermal fluid is a liquid, the geothermal fluid is introduced into a flashing vessel or zone 20 where the geothermal fluid flashes to produce additional steam. The steam, either exiting the flash zone 20 or as produced from the geothermal wells in those instances where the geothermal fluid is predominantly steam and the flash zone 20 is not present or bypassed, continues its journey through a conduit 22 and is directed through a valve 30 to a conduit 32 and enters a decontamination zone 40, the decontamination zone 40 being a fixed or fluidized bed.

The steam entering the decontamination zone 40 generally is at a pressure of about $135.7987 \times 10^3$ Newton/meter$^2$ (5 psig) to about $2859.218 \times 10^3$ Newton/meter$^2$ (400 psig) and has a temperature of about 100° C. (212° F.) to about 204.4° C. (400° F.) and a steam quality of at least about 90, preferably at least about 95, more preferably at least about 97, even more preferably at least about 98, and most preferably at least about 99, percent. The steam can also be dry, superheated steam. In addition, the steam is contaminated with at least one contaminant selected from the group consisting of acidic gases, inert particulates, and mixtures thereof. Acidic gases include, but are not limited to, HF, HCl, $SO_3$, and $SO_2$, and inert particulates include, but are not limited to, corrosion fines (e.g., magnetite), formation fines (e.g., aluminosilicates and silica), and evaporites or sublimates (NaCl, borates, arsenic, mercury, and the like).

In the decontamination zone 40, the contaminated steam contacts one or more nonaqueous sorbents that absorb and/or adsorb at least one of the entrained contaminants. Exemplary nonaqueous sorbents include, but are not limited to, crystalline molecular sieves, silica gels, soda ash, and carbonaceous adsorbents such as activated carbon and pyrolyzed ion exchange resins (e.g., Ambersorb brand pyrolyzed ion exchange resins available from Rohm & Haas).

As used herein, the term "crystalline molecular sieve" means a solid crystalline material having in its anhydrous form micropores as a consequence of having an open framework lattice characterized by an orderly arrangement of corner-sharing oxide tetrahedra, including, but not limited to, $AlO_3$, $SiO_2$, $FeO_2$, $TiO_2$, $BO_2$, and $PO_2$ tetrahedra. Crystalline molecular sieves include zeolitic and nonzeolitic molecular sieves.

With respect to zeolitic molecular sieves, as used herein, this term means crystalline molecular sieves whose frameworks are formed of substantially only silicon and aluminum atoms in tetrahedral coordination with oxygen atoms. Zeolitic molecular sieves can be either synthetic (such as Y zeolites, ZSM-5 zeolites, zeolite Beta, and zeolite Omega), natural (such as faujasite, chabazite, phillipsite, gmelinite, mordenite, clinoptilolite, erionite, natrolite, and heulandite), or modified. Modified zeolites are zeolites that have been treated with steam to reduce their unit cell size and/or have been impregnated or ion exchanged with other materials. An example of a modified zeolite is a zeolite that has been ion exchanged with ferric and/or ferrous cations, usually by slurrying the zeolite with an aqueous solution of ferric chloride and/or ferrous chloride, and then drying the resulting wet zeolite (after separation from the liquid phase of the slurry) at a temperature between about 50° and about 150° C. A modified zeolite can also be made by adding ferric chloride and sodium hydroxide to an aqueous zeolite slurry, separating the zeolite from the liquid phase of the slurry, and then calcining the separated zeolite to form a ferric oxyhydroxide coating.

Concerning nonzeolitic molecular sieves, this term is employed herein to mean crystalline molecular sieves whose frameworks are not formed of substantially only silicon and aluminum atoms in tetrahedral coordination with oxygen atoms. Crystalline silicas (such as silicalite, silicoaluminophosphates, aluminophosphates, and ferrosilicates) are examples of nonzeolitic molecular sieves.

The crystalline molecular sieve utilized preferably has adsorptive properties as well as a significant ion exchange capacity. In addition, the pore size of the crystalline molecular sieve is preferably smaller, rather than larger, with pore sizes below 6 angstroms normally being preferred.

As used herein, the term "pore size" means the diameter of the largest molecule that can be sorbed by the particular molecular sieve in question. The measurement of such diameters and pore sizes is detailed in Breck, "Zeolite Molecular Sieves", Chapter 8, Robert E. Krieger Publishing Company (1984), which book is incorporated herein in its entirety by reference.

Zeolitic molecular sieves are preferred over nonzeolitic molecular sieves in the process of the present invention and the naturally occurring zeolites are the most preferred crystalline molecular sieves because they are relatively inexpensive and have substantial ion exchange capabilities due to the presence of significant amounts of alkali and/or alkaline earth metal cations, such as sodium, calcium, potassium, and/or magnesium. The more preferred naturally occurring zeolites are chabazite, clinoptilolite and mixtures thereof. Clinoptilolite typically contains sodium and/or potassium cations and has a pore size of about 3.5 angstroms, and chabazite usually contains calcium and/or sodium and has a pore size of about 4.3 angstroms. The most preferred naturally occurring zeolites have a pore size of about 2.5 to about 4.5 angstroms.

In general, a nonaqueous sorbent having a higher surface area is preferred over the same composition having a smaller surface area, all other parameters being held constant. Thus, a 20–40 U.S. sieve series mesh size nonaqueous sorbent is preferred over a 4 U.S. sieve series mesh size of the identical composition. (Compositions having higher mesh numbers have a smaller cross-sectional area and a larger per unit surface area.)

Returning to FIG. 1, the treated steam leaving the decontamination zone 40 has a lower contaminant concentration and enters a conduit 42, passes through a valve 44, and continues along a conduit 50 to a main steam separator 60 which separates the steam from any condensate. The separated steam exiting the main steam separator 60 then proceeds through a conduit 62 to a turbine (not shown) where energy is extracted by techniques well known to those skilled in the art. Any condensate exiting the main steam separator 60 proceeds through a conduit 64 to a condensate collection basin (not shown) where it is processed by procedures well known to those skilled in the art.

Prior to the nonaqueous sorbent in the decontamination zone 40 reaching an unsatisfactory contaminant loading level, valves 30 and 44 are closed and the contaminated steam is directed through a valve 70 to a conduit 72 where it is fed into an alternative decontamination zone 80 containing one or more of the above described nonaqueous sorbents in a fixed or fluidized bed. After being treated in the alternative decontamination zone 80, the effluent steam enters a conduit 82, passes through a valve 84, and proceeds along the conduit 50 to the remainder of the system 10 as described above.

While the decontamination zone 40 is isolated from the rest of the system 10, the nonaqueous sorbent present therein is regenerated by introducing a suitable regenerant (e.g., water, air, etc.) into the decontamination zone 40 through a conduit 46. The contaminant-containing regenerant exits the decontamination zone 40 through a conduit 48 and is disposed of or treated by techniques well known to those skilled in the art.

At any convenient time prior to the nonaqueous sorbent in the alternative decontamination zone 80 reaching an unsatisfactory contaminant loading level, valves 70 and 84 are closed and the contaminated steam is redirected to the decontamination zone 40. At this point, the nonaqueous sorbent present in the alternative decontamination zone 80 is similarly regenerated by introducing a suitable regenerant into the alternative decontamination zone 80 through a conduit 86 and removing the contaminant-containing regenerant through a conduit 88.

Figure 2:
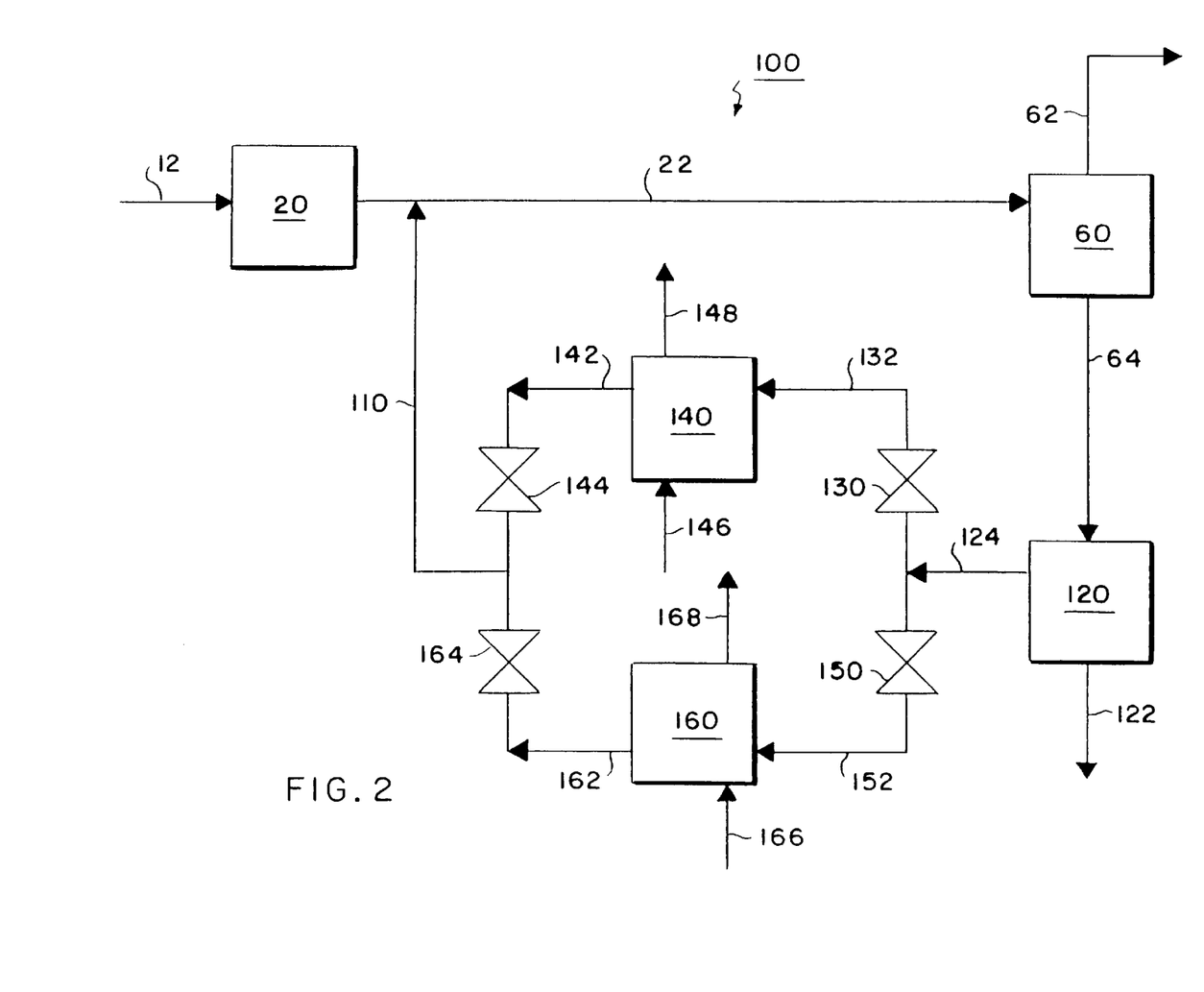
FIG. 2 is a schematic diagram of a portion of another geothermal extraction process embodying features of a second version of the invention.

In addition to being cleaned by the above described process, the contaminated steam can be scrubbed with the nonaqueous sorbent utilizing other techniques. For example, FIG. 2 illustrates a portion of an alternative system 100 embodying a second version of the present invention. In this version of the invention, the steam existing the flash zone 20 through the conduit 22 is mixed with the nonaqueous sorbent by injecting the nonaqueous sorbent into the conduit 22 from a conduit 110 or by other means well known to those skilled in the art for introducing a material into a mobile fluid. The nonaqueous sorbent becomes fluidized or otherwise mixed with or entrained in the contaminated steam.

In addition, to the nonaqueous sorbents discussed above, the nonaqueous sorbent employed in this version of the invention can also be one or more amine liquid ion exchange resins which generally have the following formula:

$$R_1R_2(R_3)_xNH_{(1-x)} \tag{1}$$

where x is 0 or 1 and $R_1$, $R_2$, and $R_3$ are independently selected from hydrocarbon groups such as alkyl, aryl, cycloalkyl, arylalkyl, and alkylaryl typically having 1 to about 30, and more typically having about 5 to about 20, carbon atoms. Exemplary alkyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl. The amine liquid ion exchange resins tend to have a high molecular weight (e.g., commonly greater than about 300, more commonly greater than about 325, and most commonly greater than about 350) and are usually water insoluble and oil-soluble.

Commercially available secondary amine liquid ion exchange resins include Amberlite LA-2 brand secondary amine liquid ion exchange resin available from Rohm & Haas and Adogen 283 brand secondary amine liquid ion exchange resin available from Witco Chemical and commercially available tertiary amine liquid ion exchange resins include Adogen 381 brand tertiary amine liquid ion exchange resin available from Witco Chemical. The properties of Amberlite LA-2 brand secondary amine liquid ion exchange resin are set forth in the following Table A.

TABLE A

| Data | Property of Amberlite LA-2 |
| --- | --- |
| Molecular Weight | 353–395 |
| Neutral Equivalent | 360–380 |
| Acid binding capacity, | |
| meq/g | 2.6–2.8 |
| meq/ml | 2.2–2.3 |
| Volume Percent Distilled below 160° C. at 10 mm Hg | 5.0% maximum |
| Appearance | clear amber liquid |
| Odor | faint, pleasant amine |
| Viscosity (25° C.), cp | 18 |
| Density (25° C.), | |
| g/l | 0.83 |
| lbs/gal | 6.9 |
| Freezing Point | below 10° C. |
| Flash Point (Cleveland, open cup) | 179.4° C. |
| 50% distilled point at 10 mm Hg | 224° C. |

The free-base and salt forms of secondary amine liquid ion exchange resins remove acids and chlorides from vapors by neutralization (as illustrated below in reactions 1 and 2) and ion exchange (as illustrated below in reaction 3):

(1)

(2)

(3)

where $R_1$ and $R_2$ are as defined above.

The amine liquid ion exchange resin, when used, is typically injected into the steam from the conduit 110 at a rate of at least about 18.14 kg (40 pounds) per hour for each 453.59 metric tons (one million pounds) of steam per hour flowing in the conduit 22. Preferably, the sorbent injection rate per 453.59 metric tons (one million pounds) of steam per hour is about 18.14 to about 27.22 kg/hr (40–60 lb/hr), more preferably about 20.41 to about 24.95 kg/hr (45–55 lb/hr), and most preferably about 22.68 kg/hr (50 lb/hr).

The entrained nonaqueous sorbent is carried through the conduit 22 by the steam into the main steam separator 60. In the main steam separator 60, the nonaqueous sorbent separates by density differential from the treated steam, with the treated steam leaving the main steam separator through the conduit 62 where it proceeds to the turbine (not shown). The separated nonaqueous sorbent exits the main steam separator 60 through the conduit 64 with any condensate that may be present in the separator 60 and is transported to a condensate catch basin 120 where the condensate is separated by density differential from the nonaqueous sorbent. When the nonaqueous sorbent is an amine liquid ion exchange resin, the condensate catch basin 120 can be a conventional solvent extract-type process consisting of a mixer (not shown) and a settler (not shown).

The condensate leaving the condensate catch basin 120 exits through a conduit 122 and is carried to the condensate collection basin (not shown). The separated nonaqueous sorbent exits the condensate catch basin via a conduit 124 and sequentially passes through a valve 130 into a conduit 132, then through a regeneration zone 140 which it leaves through a conduit 142, traverses a valve 144, and enters the conduit 110 for transport to and reintroduction into the contaminated steam in the conduit 22.

In a manner analogous to the nonaqueous sorbent regeneration procedure discussed above in connection with the previously described version of the invention, prior to the nonaqueous sorbent reaching an unsatisfactory contaminant loading level, a portion of the nonaqueous sorbent is captured in the regeneration zone 140 and valves 130 and 144 are closed. The remaining nonaqueous sorbent is directed through a valve 150 to a conduit 152 where it proceeds through an alternative regeneration zone 160 to a conduit 162 and through a valve 164 to the conduit 110.

While the regeneration zone 140 is isolated from the rest of the system 110, the nonaqueous sorbent present therein is regenerated by introducing a suitable regenerant into the zone 140 through a conduit 146. When the nonaqueous sorbent is a crystalline molecular sieve, a silica gel, soda ash, or a carbonaceous adsorbent, the regenerant is, for example, air and/or water. However, when the nonaqueous sorbent is an amine, the regenerant is preferably a high pH material such as NaOH, $NH_3$, or $NH_4OH$ and the regeneration proceeds, for example, in accordance with the following reactions 4 or 5:

(4)

(5)

where $R_1$, $R_2$, $R_3$, and x are as defined above.

The contaminant-containing regenerant exits the regeneration zone 140 through a conduit 148 and is disposed of or treated by techniques well known to those skilled in the art.

At any convenient time prior to the circulating nonaqueous sorbent reaching an unsatisfactory contaminant loading level, the circulating nonaqueous sorbent is captured in the alternative regeneration zone 160 and valves 150 and 164 are closed, valves 130 and 144 are opened, and the regenerated nonaqueous sorbent exits the regeneration zone 140 and again circulates through the system 110. At this point, the nonaqueous sorbent present in the alternative regeneration zone 160 is similarly regenerated by introducing a suitable regenerant into the alternative regeneration zone 160 through a conduit 166 and removing the contaminant-containing regenerant through a conduit 168.

Figure 3:
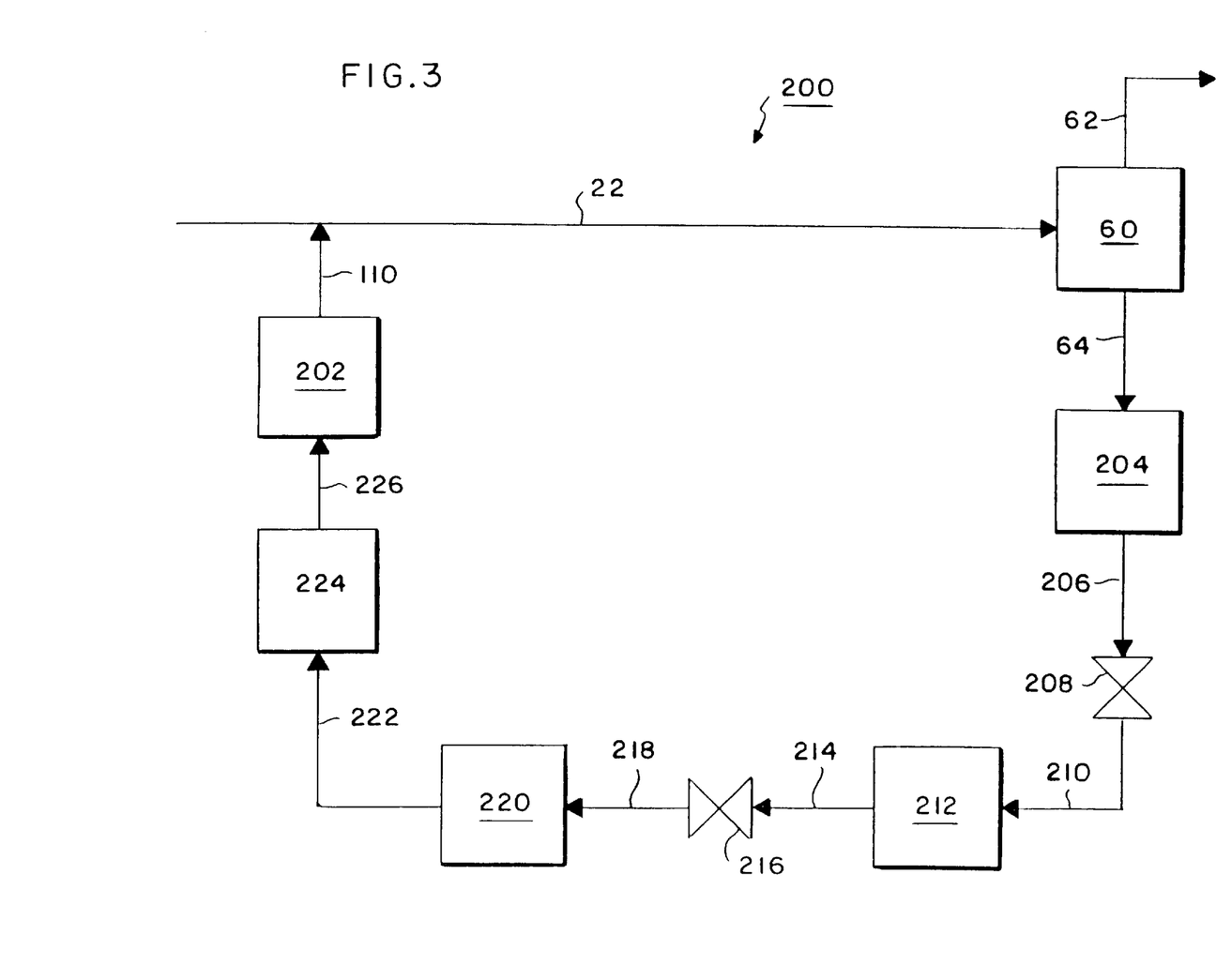
FIG. 3 is a schematic diagram of a portion of a third geothermal extraction process embodying features of another version of the invention.

A process for removing contaminants from steam in which an amine liquid ion exchange resin sorbent is continuously being regenerated is shown in FIG. 3. In particular, in system 200 of FIG. 3, a high pressure pump 202 injects the amine through the conduit 110 and into steam moving through the conduit 22. The pump 202 creates a pressure drop of at least about $2859 \times 10^3$ Newton/meter² (400 psid) in order to shear and atomize the liquid amine as much as possible to effectively contact and admix with the contaminated steam.

The entrained amine sorbent accompanies the steam through the conduit 22 into the main steam separator 60. In the main steam separator 60, the amine sorbent separates by density differential from the treated steam, with the treated steam leaving the main steam separator through the conduit 62 where it proceeds to the turbine (not shown). The separated amine sorbent exits the main steam separator 60 through the conduit 64 and passes through a high performance strainer zone 204 where any entrained particles greater than about 254µ (0.01 inch) in diameter are removed by, for example, a wire screen. Upon leaving the high performance strainer zone 204, the separated amine sorbent moves through a conduit 206 and across a control valve 208 which regulates the level in the main steam separator 60. The separated amine sorbent leaving the separator level control valve 208 is near steam temperature and is next transported by a conduit 210 to an air cooled heat exchanger 212 where it is cooled to around atmospheric temperature.

The cooled amine sorbent exits the heat exchanger 212 through a conduit 214 and traverses an isolation valve 216. The isolation valve 216 as well as the previously mentioned separator level control valve 208 are linked to a separate temperature controller (not shown) which in turn is connected to a temperature element (not shown) located along the conduit 214 between the heat exchanger 212 and the isolation valve 216. Should an unacceptably high temperature be sensed by the temperature element, the controller closes both the separator level control valve 208 and the isolation valve 216.

When the isolation valve 216 is open, the amine sorbent proceeds from the isolation valve 216 through a conduit 218 and into a sorbent regeneration zone 220. In one embodiment of this version of the invention, the sorbent regeneration zone 220 is a stirred column with flow baffles (not shown). In this embodiment, the sorbent enters the bottom of the column through fixed nozzles (not shown). A regenerant solution is present in the column and is selected so that it has a density greater than that of the sorbent. For example, a 25% NaOH solution has a specific gravity of about 1.28 whereas Amberlite LA-2 brand secondary amine liquid ion exchange resin has a specific gravity of about 0.83. Therefore, because the amine sorbent is less dense than the regenerant solution, the amine sorbent flows up through the regenerant solution. While flowing up through the regenerant solution, the sorbent is constantly agitated by stirring paddles (not shown). Flow baffles (not shown) are optionally present in the column to further facilitate contact between the sorbent and regenerant solution and thereby aid in the regeneration of the sorbent. Regenerated sorbent accumulates in the top of the column and exits the regeneration zone 220 via a conduit 222 and flows by gravity to a sorbent storage tank 224. The sorbent is stored in the storage tank 224 until it reenters the above described process by exiting the storage tank 224 through a conduit 226 which transports the sorbent to the high pressure pump 202.

EXAMPLES

The following examples are intended to illustrate, but not limit, the invention. Examples 1–5 describe a laboratory experiment which demonstrated that a secondary amine removes an acidic gas (i.e., HCl) from steam. Examples 6–22 detail a screening procedure used to confirm that a number of other materials can be employed as the nonaqueous sorbent in the present invention.

Examples 1–5

Steam Cleaning Experiments

Two sorbents were studied—Amberlite LA-2 brand liquid ion exchange resin and hydrotalcite ($[Mg_2Al(OH)_6]^+$ $[0.5CO_3 \cdot nH_2O]^-$). Amberlite LA-2 is commercially available from Rohm & Haas and is a high molecular weight, water insoluble amine liquid supplied in free-base form. Hydrotalcite was prepared in the laboratory. In addition, water and a NaOH solution were tested for comparison to simulate current commercial water wash and corrosive steam mitigation practices, respectively.

The experimental procedure consisted of preparing a dilute 2 N HCl solution, placing the solution in a flask, and heating the flask and its contents to boil off HCl. The gaseous HCl was routed to a bubbler which was inserted into a test tube containing one of the sorbents being tested. The results of chloride removal from these HCl vapor trapping experiments are shown below in Table 1.

TABLE I

Vapor Removal Results

| Ion Exchanger-Adsorbent | Chloride Sorbed, ppm |
| --- | --- |
| Distilled water | 125 |
| 0.1 N NaOH | 1660 |
| LA-2 | 3380 |
| LA-2 (repeat) | 3940 |
| Hydrotalcite | <100 |

As shown above in Table I, more chloride was removed from the vapor by Amberlite LA-2 than by either the NaOH solution or water. However, hydrotalcite did not remove HCl in the laboratory test.

Examples 6–22

Additional Steam Cleaning Experiments

Qualitative laboratory tests of HCl removal from steam vapors were conducted by boiling a weak HCl solution and passing the vapor through small columns of the various materials set forth below in Table II. HCl was monitored at the outlet of the column using litmus paper to detect HCl vapors to determine qualitatively how the test materials performed in removing HCl and how quickly HCl broke through the column. The results of these experiments are summarized in Table II.

TABLE II

Steam Cleaning Results

| Cleaner | Qualitative Results |
| --- | --- |
| Limestone | Initially removed HCl, but breakthrough after 5 minutes |
| Zeolite Mixture (chabazite & clinoptilolite) | Excellent removal; no breakthrough |
| Chabazite Zeolite | Excellent removal; no breakthrough |
| Clinoptilolite Zeolite 20–40 mesh | Excellent removal; no breakthrough |
| Clinoptilolite Zeolite 4 mesh | Good removal; eventual breakthrough |
| Hydrotalcite | Moderately fast breakthrough after 2 minutes |
| Silica Gel | Excellent removal; no breakthrough |
| Drierite ($CaSO_4$) | Moderately fast breakthrough after 3 minutes |
| Soda Ash Spheres | Excellent removal; no breakthrough |
| Pump Oil | Immediate breakthrough |

TABLE II-continued

Steam Cleaning Results

| Cleaner | Qualitative Results |
| --- | --- |
| 10–30W Motor Oil | Immediate breakthrough |
| TG550A brand Anionic Resin Beads | Moderately fast breakthrough after 2 minutes |
| Phenolic Foam | Moderately fast breakthrough; fumes generated |
| Granular Activated Carbon 4 mesh | Excellent removal; no breakthrough |
| LA-2 Liquid anion Exchange Resin | Excellent removal; no breakthrough |
| Adogen 283 brand sec-Amine | Excellent removal; no breakthrough |
| Adogen 381 brand tert-Amine | Excellent removal; no breakthrough |

As shown above in Table II, lime, soda ash, zeolites, silica gel, granular activated carbon, and amines satisfactorily removed HCl from steam vapor.

Although the present invention has been described in detail with reference to some preferred versions, other versions are possible. For example, with reference to FIG. 2, the nonaqueous sorbent and any condensate exiting the main steam separator 60 through the conduit 64 can proceed directly to either regeneration zone 140 or 160 without traversing the condensate catch basin 120 and any condensate can be removed in the regeneration zones 140 and 160. In addition, the heat exchanger 212 shown in FIG. 3 can alternatively be water cooled and other regeneration equipment can be employed in the regeneration zone 220 in place of that described herein. Accordingly, the spirit and scope of the appended claims should not necessarily be limited to the description of the preferred versions contained herein.

What is claimed is:

1. A method for decontaminating steam, the method comprising the sequential steps of:
    (a) contacting steam containing an acidic gas with an amine sorbent to form a treated steam having a reduced acidic gas concentration; and
    (b) separating the treated steam from the amine sorbent.

2. The method of claim 1 where the amine sorbent is an amine liquid ion exchange resin.

3. The method of claim 1 where the amine sorbent comprises a secondary amine liquid ion exchange resin.

4. The method of claim 1 where the amine sorbent comprises a tertiary amine liquid ion exchange resin.

5. The method of claim 1 where the acidic gas is selected from the group consisting of HF, HCl, $SO_3$, $SO_2$, and mixtures thereof.

6. The method of claim 1 where the steam quality is at least about 90 percent.

7. The method of claim 1 where the steam is dry, superheated steam.

8. A method for extracting energy from a geothermal fluid, the method comprising the steps of:
    (a) producing a geothermal fluid from a geothermal well, where the geothermal fluid comprises steam containing at least an acidic gas;
    (b) contacting the acidic gas-containing steam with an amine sorbent to form a treated steam having a reduced acidic gas concentration;
    (c) separating the treated steam from the amine sorbent; and
    (d) extracting energy from the separated, treated steam.

9. The method of claim 8 where steps (b) and (c) are performed simultaneously by passing the contaminated steam through a fixed bed comprising the amine sorbent.

10. The method of claim 8 where step (b) comprises mixing the amine sorbent in the acidic gas-containing steam.

11. The method of claim 8 where at least a portion of the amine sorbent employed in step (b) is the amine sorbent separated in step (c).

12. The method of claim 8 further comprising the step (e) of regenerating at least a portion of the amine sorbent separated in step (d).

13. The method of claim 8 where step (d) comprising passing the separated, treated steam through a turbine, the turbine being in communication with a generator.

14. The method of claim 8 where the geothermal fluid further comprises condensate and the method further comprises the step of separating at least a portion of condensate from the acidic gas-containing steam prior to step (b).

15. A method for decontaminating steam, the method comprising the sequential steps of:
    (a) contacting steam having a temperature of at least 100° C. and containing HCl with an amine liquid ion exchange resin to form a treated steam having a reduced HCl concentration; and
    (b) separating the treated steam from the amine liquid ion exchange resin.

16. The method of claim 15 where the steam contacted with the amine liquid ion exchange resin is step (a) has a steam quality of at least 90 percent.

17. The method of claim 15 where the amine liquid ion exchange resin is selected from the group consisting of secondary and tertiary amine ion exchange resins.

18. The method of claim 15 where the amine liquid ion exchange resin comprises a secondary amine ion exchange resin.

19. The method of claim 15 where the amine liquid ion exchange resin comprises a dialkyl secondary amine ion exchange resin.

20. A method for extracting energy from a geothermal fluid, the method comprising the steps of:
    (a) producing a geothermal fluid from a geothermal well, where the geothermal fluid comprises steam having a temperature of at least 100° C. and containing HCl;
    (b) contacting the HCl-containing steam with an amine liquid ion exchange resin to form a treated steam having a reduced HCl contaminant concentration;
    (c) separating the treated steam from the amine liquid ion exchange resin; and
    (d) extracting energy from the separated, treated steam.

21. A system for extracting energy from a geothermal fluid, the system comprising:
    (a) means for producing a geothermal fluid from a geothermal well, where the geothermal fluid comprises steam containing at least an acidic gas;
    (b) means for contacting the acidic gas-containing steam with an amine sorbent to form a treated steam having a reduced acidic gas concentration, the contacting means being in fluid communication with the producing means;
    (c) first means for separating the treated steam from the amine sorbent, the first separating means being in fluid communication with the contacting means; and
    (d) means for extracting energy from the separated, treated steam, the energy extracting means being in fluid communication with the first separating means.

22. The system of claim 21 where the system further comprises steam in intimate contact with the amine sorbent proximate the contact means.

23. The system of claim 21 further comprising means for recycling the separated amine sorbent to contacting means, the recycling means being in fluid communication with the second separating means and contacting means.

24. The system of claim 23 further comprising means for regenerating at least a portion of the separated amine sorbent, the regenerating means being in fluid communication with the recycling means.

25. The system of claim 21 where the contacting means and the first separating means together comprise a fixed bed comprising the amine sorbent.

26. The system of claim 25 further comprising means for regenerating at least a portion of the separated amine sorbent, the regenerating means being in fluid communication with the amine sorbent-containing fixed bed.

27. The system of claim 21 where the geothermal fluid further comprises condensate and the system further comprises a second means for separating at least a portion of the condensate from the acidic gas-containing steam, the upstream side of the second separation means being in fluid communication with the producing means and the downstream side of the second separating means being in fluid communication with the contacting means.

* * * * *

UNITED STATES PATENT AND TRADEMARK OFFICE
CERTIFICATE OF CORRECTION

PATENT NO. : 5,879,433
DATED : March 9, 1999
INVENTOR(S) : Darrell L. Gallup and Thomas S. Powell It is certified that error appears in the above-indentified patent and that said Letters Patent is hereby corrected as shown below:

On the title page: Item [56] Other Publication:

Replace "Adogen Amines for Solvent Extraction," Sherix Chemical Company, Inc., Dubli, Ohio, rev. 1-83 with

-- "Adogen Amines for Solvent Extraction," Sherex Chemical Company, Inc., Dublin, Ohio, rev. 1-83 --.

Signed and Sealed this

Twenty-eighth Day of March, 2000

Attest:

Q. TODD DICKINSON

*Attesting Officer*　　　　*Commissioner of Patents and Trademarks*